(12) United States Patent
Shapiro (10) Patent No.: US 11,533,371 B2
(45) Date of Patent: Dec. 20, 2022

(54) SYSTEMS, METHODS, AND PROGRAM PRODUCTS FOR PROVISION OF EXPERT SERVICES OVER A NETWORK IN REAL TIME

(71) Applicant: LonePine Digital Inc., New York, NY (US)

(72) Inventor: Cassel Shapiro, New York, NY (US)

(73) Assignee: LONEPINE DIGITAL INC., New York, NY (US)

( * ) Notice: Subject to any disclaimer, the term of this patent is extended or adjusted under 35 U.S.C. 154(b) by 7 days.

(21) Appl. No.: 16/949,937

(22) Filed: Nov. 20, 2020

(65) Prior Publication Data

US 2022/0166837 A1 May 26, 2022

(51) Int. Cl.
*H04L 29/08* (2006.01)
*G06F 16/955* (2019.01)
*H04L 67/141* (2022.01)
*G06F 3/04842* (2022.01)

(52) U.S. Cl.
CPC ........ *H04L 67/141* (2013.01); *G06F 16/955* (2019.01); *G06F 3/04842* (2013.01)

(58) Field of Classification Search
CPC ..... H04L 67/141; H04L 67/14; G06F 16/955; G06F 16/954; G06F 3/04842; G06F 3/04817
USPC ........................................................ 709/227
See application file for complete search history.

(56) References Cited

U.S. PATENT DOCUMENTS

| | | | | |
|---|---|---|---|---|
| 9,313,332 | B1* | 4/2016 | Kumar | H04M 3/5166 |
| 2001/0032164 | A1* | 10/2001 | Kim | G06Q 30/0601 |
| | | | | 705/26.1 |
| 2013/0046571 | A1* | 2/2013 | Tuchman | G06Q 10/06 |
| | | | | 705/7.14 |
| 2014/0067582 | A1* | 3/2014 | Wolfram | G06Q 30/0207 |
| | | | | 705/26.3 |
| 2014/0140489 | A1* | 5/2014 | Schoenberg | H04M 1/271 |
| | | | | 379/266.01 |
| 2014/0229258 | A1* | 8/2014 | Seriani | G06Q 10/06311 |
| | | | | 705/14.23 |
| 2015/0098561 | A1* | 4/2015 | Etison | G06Q 10/06398 |
| | | | | 379/265.06 |
| 2015/0310446 | A1* | 10/2015 | Tuchman | H04L 51/10 |
| | | | | 705/304 |
| 2016/0119477 | A1* | 4/2016 | Sharpe | G06Q 30/0261 |
| | | | | 379/265.09 |
| 2017/0359232 | A1* | 12/2017 | Stoops | H04L 41/0686 |
| 2018/0115645 | A1* | 4/2018 | Iyer | G06Q 10/063112 |

* cited by examiner

*Primary Examiner* — Ruolei Zong
(74) *Attorney, Agent, or Firm* — Tarter Krinsky & Drogin LLP (57) ABSTRACT

Systems and methods for providing online real-time expert services are disclosed. In exemplary embodiments, a plurality of user and provider devices communicates with a consulting engagement server over a network. The consulting engagement server includes a plurality of modules that are implemented in software, and which, when executed, provide for the marketing and provision of expert services by providers to users over a network in real time.

20 Claims, 5 Drawing Sheets

*Flow: Past and Upcoming Engagements*

[Review Past and Upcoming Sessions - Sessions Module 124]

SYSTEMS, METHODS, AND PROGRAM PRODUCTS FOR PROVISION OF EXPERT SERVICES OVER A NETWORK IN REAL TIME

FIELD

The present invention generally relates to systems and methods for providing real-time expert services over a network.

BACKGROUND

Virtually every person has found themselves in immediate need of expert assistance at their preferred location. For example, a do-it-yourselfer in the midst of a project may find themselves in need of guidance from a master plumber, carpenter or mechanic. Likewise, a traveler may find themselves in momentary need of an interpreter or expert in local customs. Current solutions to obtain such expert services can be cumbersome as, among other things, they: can require inordinate amounts of time and research to locate a suitable expert; can require such advanced scheduling of the resulting engagement as to render the timing of the solution unresponsive to the urgency of the need; and cannot provide for an integrated means of communication with which to remotely access the expertise sought.

What is needed are systems and methods whereby end users in need of a broad array of expert services can obtain those services online in real time from remotely located independent or retained service provider experts via a network. What is also needed are methods and systems whereby an independent or retained service provider expert can market to a broad audience the availability of their services for online real-time consumption.

SUMMARY

The present invention addresses the technological problems by providing new and improved computer systems and methods for providing expert services to those in need of such services in a real-time, interactive, integrated online environment.

Among other things, the present invention provides an elegant, user-friendly system and method for quickly and efficiently locating and engaging online with an expert in real time. Using a mobile application installed on a smartphone, a user may first select a category of expert with which he or she seeks to connect (e.g., tradesmen, fitness instructors). Thereafter, the user may be presented with a list of specialties thereof from which to choose (e.g., plumber, electrician, yoga instructor). The user can then review a list of available experts approved to provide the sought specialty online in real time, which list can be sorted or filtered by ranking, proficiency, pricing, etc.

Notably and among other things, once a user has identified a specific service provider with whom he or she wishes to immediately consume an online real-time engagement through the mobile application, the system and method identifies additional service providers that are available to provide the sought specialty at similar terms as the sought provider so such identified additional providers may act as an immediately available backup thereby ensuring the online real-time engagement is consummated in a timely manner, regardless of whether the sought provider is available to begin the engagement immediately. The present invention also provides methods for procuring an online real-time engagement from a selected provider at a scheduled time. Additionally, the present invention provides methods for procuring the first available expert approved to provide the sought specialty without preference for and selection of a particular provider, and also provides for auctions of online real-time engagements with expert providers. These features, as well as the others described below, provide previously unavailable systems and methods that allow users to engage with experts in real time over a network.

In accordance with exemplary embodiments, a method of providing real-time expert services over a computer network comprises (A) receiving, at a computer system comprising one or more computers, from a user device, a login request and user connection information for the user device; (B) responsive to the login request, retrieving, by the computer system from a database operatively connected to the computer system, a plurality of data objects, wherein each data object includes data that corresponds to one of a plurality of expert service providers; (C) transmitting, by the computer system to the user device using the user connection information, the plurality of data objects, wherein the user device is configured to render a graphical user interface that displays information corresponding to the plurality of data objects; (D) receiving, by the computer system from the user device, a selection indication corresponding to a first expert service provider from the plurality of expert providers; (E) determining, by the computer system in response to the selection indication, first provider connection information for a first provider device corresponding to the first expert service provider; (F) transmitting, by the computer system to the first provider device using the first provider connection information, a first connection request; (G) receiving, by the computer system from the first provider device, a first confirmation indication; (H) establishing, by the computer system, a first communication session between the user device and first provider device; and (I) managing, by the computer system, the first communication session, wherein the managing comprises: a. receiving first data from the user device; b. transmitting the first data to the first provider device using the first provider connection information; c. receiving second data from the first provider device; and d. transmitting the second data to the user device using the user connection information.

In accordance with exemplary embodiments, the user device is a mobile computing device.

In accordance with exemplary embodiments, the provider device is a mobile computing device.

In accordance with exemplary embodiments, the first and second data comprise text and image data.

In accordance with exemplary embodiments, the first and second data comprise real-time video data.

In accordance with exemplary embodiments, each of the plurality of data objects corresponding to one of the plurality of expert service providers includes an availability indicator for the corresponding provider, a specialty for the corresponding provider, and a price for the corresponding provider.

In accordance with exemplary embodiments, the method further comprises (J) determining, by the computer system, that the first expert service provider is unavailable; (K) determining, by the computer system, an alternate expert service provider that is currently available; (L) determining, by the computer system, alternate provider connection information for an alternate provider device corresponding to the alternate expert service provider; (M) transmitting, by the computer system to the alternate provider device using the alternate provider connection information, a second connection request; (N) receiving, by the computer system from the alternate provider device, a second confirmation indication; and (O) establishing, by the computer system, a second communication session between the user device and the alternate provider device.

In accordance with exemplary embodiments, the method further comprises (J) receiving, by the computer system from the user device, a selection indication corresponding to a specialty that is immediately sought, wherein the selection indication does not specify a provider; (K) determining, by the computer system, a second expert service provider that provides the immediately sought specialty and that is currently available; (L) determining, by the computer system, second provider connection information for a second provider device corresponding to the second expert service provider; and (M) establishing, by the computer system, a second communication session between the user device and the second provider device.

In accordance with exemplary embodiments, the method further comprises (J) receiving, by the computer system from the user device, a bid amount corresponding to expert services provided by a second expert service provider, wherein the expert services provided by the second expert service provider are offered by means of an auction; (K) determining, by the computer system, that the bid amount received from the user device upon the completion of the auction is greater than a plurality of previously received bid amounts; (L) determining, by the computer system in response to the determination in step (K), second provider connection information for a second provider device corresponding to the second expert service provider; (M) transmitting, by the computer system to the second provider device using the second provider connection information, a second connection request; (N) receiving, by the computer system from the second provider device, a second confirmation indication; and (O) establishing, by the computer system, a second communication session between the user device and the second provider device.

In accordance with exemplary embodiments, a system comprising a processor and a memory is provided, wherein the processor is programmed to perform the above method of providing real-time expert services over a computer network.

In accordance with exemplary embodiments, a computer-readable medium that stores a plurality of instructions is provided, wherein the instructions, when executed by a processor that operatively connected to a computer system, cause the processor to perform the above method of providing real-time expert services over a computer network.

DESCRIPTION OF THE DRAWINGS

Exemplary embodiments of the present invention will be described with references to the accompanying figures, wherein:

FIGS. 2-4 illustrate exemplary graphical user interfaces on user and/or provider devices that utilize the consulting engagement system, in accordance with embodiments of the present invention.

DETAILED DESCRIPTION

The present invention generally relates to systems and methods for providing expert services in real time over a computer network. In embodiments, the present invention seeks to address the technological problem of both marketing such expert services and providing such real-time online expert services in an integrative manner inclusive of among other things procurement, fulfillment, communications, review, dispute resolution and payment processing. In exemplary embodiments, the present invention addresses technological barriers to the provision of such expert services by providing a plurality of user devices, a plurality of provider devices, and a consulting engagement server with which the user and provider devices communicate.

Figure 1:
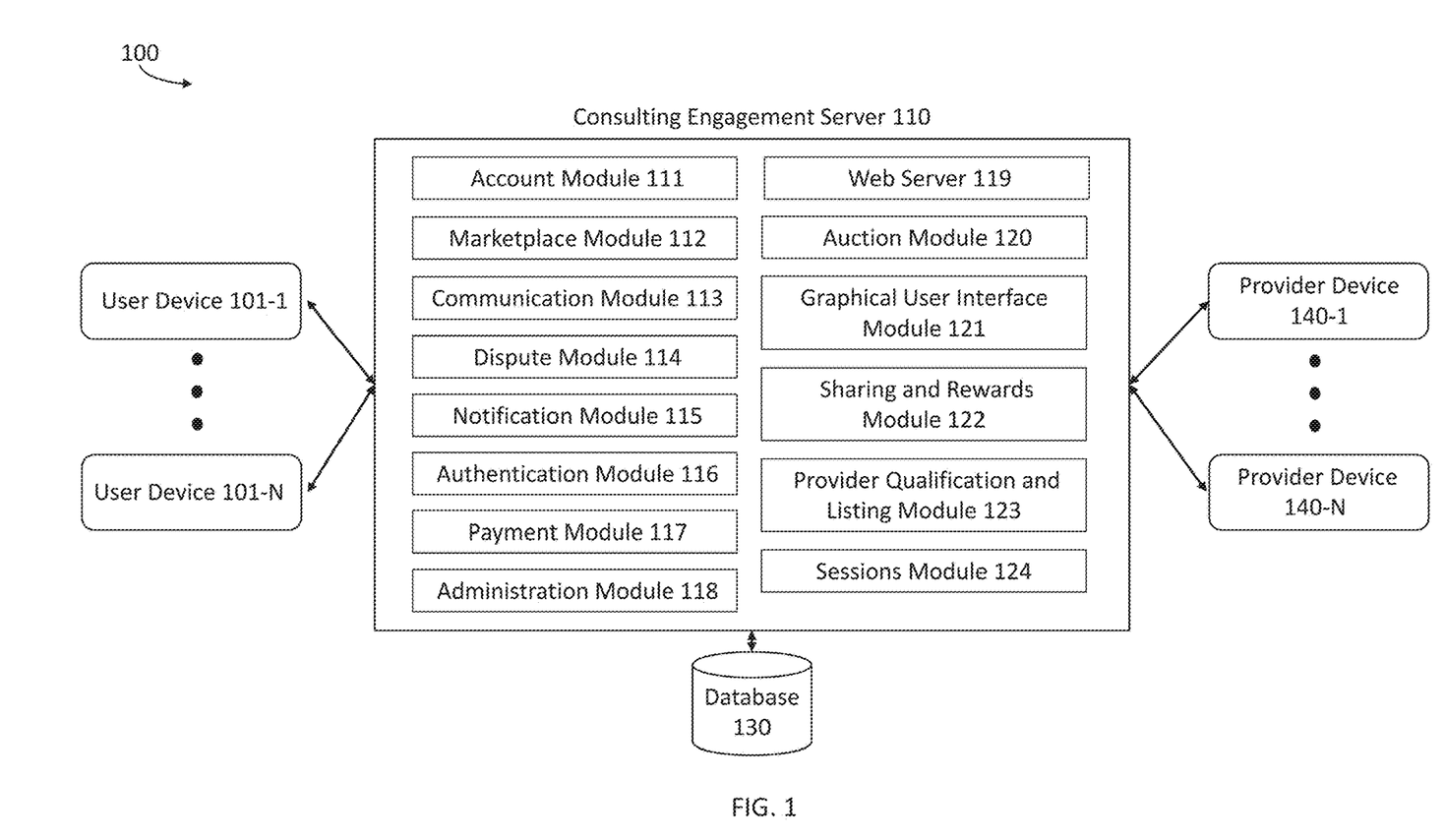
FIG. 1 illustrates an exemplary consulting engagement system in accordance with exemplary embodiments of the present invention.

FIG. 1 is a block diagram that illustrates a consulting engagement system, generally designated by reference number 100, in accordance with an exemplary embodiment of the present invention. System 100 includes a plurality of user devices 101, designated as user device 101-1 through user device 101-n. Each user device 101 can be a smartphone, a personal computer, a tablet computer, a laptop computer, a cellular telephone, or any other type of personal electronic computing device. Each user device 101 is equipped with a screen for outputting graphical user interfaces and one or more components that provide capability for inputting data, such as, for example, a touchscreen, a keyboard, or a mouse. Further, each user device 101 includes one or more processors, memory, and can include auxiliary storage, such as, for example, a hard disk drive. User device 101 also includes a network adapter or other component that enables the device to communicate over a local or wide area network, such as, for example, the Internet. Network communication can be wired or wireless. Wireless communication can occur over a cellular telephone network, a Bluetooth connection, or WiFi. Each user device 101 also can include a built-in camera or video capture device, and microphone, which enables the device to transmit real-time images and sound over a network.

System 100 also includes a plurality of provider devices 140, designated as provider device 140-1 through provider device 140-n. Each provider device 140 can be a smartphone, a personal computer, a tablet computer, a laptop computer, a cellular telephone, or any other type of personal electronic computing device. Each user device 140 is equipped with a screen for outputting graphical user interfaces, one or more components that provide capability for inputting data, such as, for example, a touchscreen, a keyboard, or a mouse. Further, each provider device 140 includes one or more processors, memory, and can include auxiliary storage, such as, for example, a hard disk drive. Each provider device 140 also includes a network adapter or other component that enables the device to communicate over a local or wide area network, such as, for example, the Internet. Network communication can be wired or wireless. Wireless communication can occur over a cellular telephone network, a Bluetooth connection, or WiFi. Each provider device 140 also can include a built-in camera or video capture device, and microphone, which enables the device to transmit real-time images over a network.

System 100 also includes a consulting engagement server 110. Consulting engagement server 110 can comprise one or more computers, which can be server-grade computers, mainframe computers, personal computers, laptops, notebooks, or any other computing device capable of executing instructions. Consulting engagement server 110 includes one or more processors, memory, auxiliary storage, input means (such as a keyboard or touchscreen) and output means (such as one or more screens).

Consulting engagement server 110 executes software that enables both the marketing and provision of expert services by providers using provider devices 140 to users using user devices 101. To enable such provision of expert services, consulting engagement server 110 executes software in a plurality of modules. In embodiments, these modules can include an account module 111, a marketplace module 112, a communication module 113, a dispute module 114, a notification module 115, an authentication module 116, a payment module 117, an administrator module 118, a web server 119, an auction module 120, a graphical user interface module 121, a sharing and rewards module 122, a provider qualification and listing module 123, and a sessions module 124.

In embodiments, graphical user interface module 121 includes software that, when executed by consulting engagement server 110 and the above listed modules thereof, provides screens, data, and/or graphical and text-based user interfaces that are rendered on user devices 101 and provider devices 140.

In embodiments, account module 111 provides for the creation of user and provider accounts in system 100. In embodiments, a provider creates an account as a service provider by entering information in a graphical user interface on provider device 140. Information includes personal information (such as name and location), a unique username, a desired password for accessing system 100, a profile picture or video, and a brief personal summary description about the provider. In embodiments, the provider can also provide bank or other payment information (such as, for example, a Stripe or PayPal account) so that payment for services rendered can be received using system 100. In embodiments, the provider can specify how he or she wishes to be contacted related to general information, payments, engagements, and other matters. A provider can specify to be contacted via a "ping" on provider device 140, or via text, email, or phone. Further, the provider can elect to receive an onboarding tutorial, which can be either text- or video-based. The onboarding tutorial can, for example, provide a walk-through for how providers use system 100 to apply to be approved to provide services, set pricing, edit personal information and service listings, and receive payment. In embodiments, a provider can also integrate a provider account with a social media account, such as Google or Facebook, to provide a seamless and integrated single sign on (i.e., the provider's Facebook password would be used as the password for system 100). Further, a provider can specify in which languages he or she will interact with the graphical user interface of system 100 such as in English, Spanish, Chinese, or any other language. Further, the provider can also connect the account to his or her contact lists, which enables the provider to find and invite clients, friends or others to utilize his or her services through system 100.

In embodiments, the provider qualification and listing module 123 provides the provider with the ability to apply to be approved to provide services and to list approved services on system 100. A provider can, in embodiments, apply to be approved to provide multiple services from among an approved list of service categories and respective specialties thereof, such as category "fitness" specialty "yoga", and category "tutoring" specialty "high school level math", for example. Utilizing the graphical user interface to the provider qualification and listing module 123 on provider device 140, a provider can submit one application for each specialty for which the provider seeks approval to provide services. Each application can consist of a written summary of the provider's experience of having provided that specialty in the past. Each application can also include among other things links to or copies of evidentiary supporting information such as: video demonstrating proficiency; websites and other marketing materials; reviews; and licenses, accreditations or certifications if such are customarily or statutorily required to provide that specialty (e.g., law, electrician). In embodiments, a provider can provide a brief summary and photos and/or videos to be included in the listing for each specialty for which he or she seeks approval to provide.

In embodiments, the provider qualification and listing module 123 graphical user interface on provider device 140 also enables the provider to accept the system 100 recommended price per minute or quantum of time for the respective service to be offered or to set his or her own pricing for such service, set pricing limits for services, set pricing for services based on availability (immediate or services schedule in the future), set hours of availability, and share recordings of past service engagements (provided that a user has consented to such sharing). Further, a provider can, in embodiments, offer free or discounted trial periods per user. In such embodiments, a provider can limit the total amount of free or discounted time to be provided per day, week, or month.

In embodiments, the provider qualification and listing module 123 graphical user interface on provider device 140 enables the provider to set special terms and conditions for trials and to define specific scheduling parameters and time periods for trials. Further, in embodiments, a provider can offer discounts and credits for services. For example, a provider can provide a discount to returning users. A provider can also provider an offer code that can be shared for the purpose of attracting buyers.

When the provider is finished both defining all of the parameters for the account and applying to be approved to provide various services, the graphical user interface provides for submission of the information to consulting engagement server 110. Account module 111, and provider qualification and listing module 123, respectively verify the respective information provided and, if verified, store the account in database 130, as shown in FIG. 1. In embodiments, database 130 can be a relational, hierarchical, or object database. In embodiments, database 130 can also be a text file or any other data structure or object capable of storing information in a retrievable manner.

In embodiments, a user also creates an account using a graphical user interface of account module 111 provided on a user device 101. In such a graphical user interface, the user can enter personal information, enter contact information, create a unique username, set a password, provide a profile picture, and set payment information. Like with provider accounts, user accounts can be integrated with Google or Facebook accounts to provide for a single sign on. Payment information can include credit card payment processing or other forms of convenient online payment facilities such as Stripe or PayPal. In embodiments, the user can specify how he or she wishes to be contacted related to general information, payments, disputes, engagements, and other matters. A user can specify to be contacted via a "ping" on user device 101, or via text, email, or phone.

In embodiments, users can access an onboarding guide that instructs the user how to utilize the account module 111 and other modules of system 100. The user onboarding guide can provide a tutorial or walk-through for searching for services through the marketplace module 112, disputing past engagements through dispute module 114, and general best practices for using system 100. The user can also opt to skip the onboarding tutorial.

In embodiments, a user or provider can access system 100 without an account to explore functionality such as browsing service categories and specialties, providers, auctions, and watching live or prerecorded engagements.

When the user is finished defining all of the parameters for the user account, the graphical user interface provides for submission of the information to consulting engagement server 110. As with provider accounts, account module 111 verifies the information provided and, if verified, stores the account in database 130, as shown in FIG. 1.

System 100 also provides providers and users the ability to edit their account and profile settings after accounts have been created. In embodiments, a provider accesses a graphical user interface on provider device 140 to update account or profile settings. In embodiments, a provider can revise notification preferences and payment preferences (e.g., via a bank, Stripe or PayPal). For example, a provider can edit contact information, edit the profile photograph, and edit personal information. In embodiments, a provider can also edit or rescind applications to provide services, edit an availability schedule, edit service description listings, and edit service rates.

In embodiments, edits to a provider's account, profile, and applications to provide services or listings therewith are submitted via the graphical user interface to consulting engagement server 110, where the edits are verified by account module 111 and/or provider qualification and listing module 123, respectively. If verified, the edits are then saved by account module 111 and/or provider qualification and listing module 123 to database 130.

In embodiments, through a graphical user interface to sessions module 124, a provider can view a log of all past engagements conducted on system 100. Providers can view recordings of prior sessions. In embodiments, a provider can see all of his or her earnings using system 100. A provider can also view reviews of past service engagements submitted by users. These reviews can be filtered by time or by keyword.

In embodiments, a provider can suggest new service categories and/or specialties thereof for approval onto the platform. In embodiments, limited administrative privileges are provided to some providers of system 100 who can then approve these newly suggested service categories and specialties thereof.

Like providers, users can also edit their accounts and profiles. In embodiments, a user accesses a graphical user interface on user device 101 through which a user can edit account and profile information. For example, a user can edit personal information, contact information, and/or a profile photograph. Further, a user can edit notification preferences and payment methods.

Changes to a user account or profile are submitted by user device 101 to consulting engagement server 110. Account module 111 verifies the changes and saves the changes to database 130.

In embodiments, through a graphical user interface to the sessions module 124, a user can access a list of past engagements and view recordings thereof, see a list of upcoming engagements, request to reschedule or cancel upcoming engagements, rehire a provider with whom he or she has engaged in the past, and add a provider to a "favorites" list propagated in marketplace module 112. A user can also view all the reviews the user submitted. These reviews can be filtered by time or keyword.

In embodiments, marketplace module 112 comprises instructions that, when executed by consulting engagement server 110, provides a central listing of service offerings and auctions that can be viewed on a graphical user interface rendered on user devices 101.

In embodiments, via marketplace module 112, users can browse and/or filter to identify a specific service provider with whom the user wishes to engage immediately or with whom the user wishes to schedule a subsequent engagement, or conversely the user can specify a service category and specialty sought immediately and be connected to the first available provider meeting the specified criteria. In exemplary embodiments of both instances, the user can filter by category and/or specialty thereof, and/or best-selling providers or influencers (notables or celebrities), and/or by price, and/or quality of reviews (such as average review out of five stars). A user can also search for a specific service provider by the service provider's unique username. A user can also browse auctions. A user can also view featured providers.

In embodiments, once a user has identified a specific service provider with whom he or she wishes to immediately engage, marketplace module 112 identifies additional service providers that are presently available to provide the sought service at the same price as the sought provider so such identified additional providers may act as an immediately available backup to ensure the engagement is consummated in a timely manner regardless of whether the sought provider is available to begin the engagement immediately. Marketplace module 112 presents through the graphical user interface a list of such available suitable backup providers from which the user may select those with whom he or she wishes to engage or unselect those with whom he or she does not wish to engage if the preferred provider is unavailable.

In embodiments, the marketplace module 112 also provides for a user to select to be connected with the first available provider approved to provide the sought specialty without the need for the user to first select a preferred provider.

In embodiments, users and providers consummate an engagement by means of and through system 100, utilizing communications module 113.

In embodiments, communication module 113 comprises instructions that, when executed by consulting engagement server 110, facilitates communication between users and providers. In embodiments, communication module 113 enables an end user to initiate a video conference with a provider for consummation of an engagement, and vice versa. Further, communication module 113 enables an end user to initiate a voice call with a provider for consummation of an engagement, and vice versa. In such embodiments, calls can be initiated using non-identifying numbers to preserve privacy. In embodiments, communication module 113 enables an end user to message a provider either through the platform using direct messaging or via SMS, and vice versa. As with voice calls, in application SMS messaging can be performed, in embodiments, with non-identifying numbers. Further, in embodiments, communication module 113 enables providers and users to share their device screens during an engagement in order to facilitate communication.

In embodiments, notification module 115 comprises instructions that, when executed by consulting engagement server 110, provides notifications to providers and users when certain event triggers take place. For example, a provider can configure his or her account to receive notifications when the provider is hired for an immediate engagement or is sought as backup provider for an immediate engagement, and/or when a scheduled engagement is requested, when a scheduled engagement is about to begin, when a user reviewed an engagement with the provider, when the provider has been paid, when a review of a disputed prior engagement has resulted in a cancellation of payment, and when the payment module 117 has processed a payment to the provider's specified account (e.g., via bank, Stripe or Paypal account).

In embodiments, users can also receive notifications based on triggers through the notification module 115. For example, in some embodiments, a user can receive a notification when a provider has accepted a proposed scheduled engagement, when a scheduled engagement is about to begin, when there has been a payment such as when a credit card has been charged, when new services have been offered, when auctions are about to end, when a credit or refund has been granted, and/or when offers from past providers have been made via system 100.

In embodiments, dispute module 114 comprises instructions that, when executed by consulting engagement server 110, receive information related to disputed charges and services and provides a means for tracking and ultimately resolving these disputes.

In embodiments, a user accesses a graphical user interface to dispute module 114 on user device 101 in order to submit a dispute to system 100. The graphical user interface of sessions module 124 then provides for a user to select upon which past engagement the user is initiating a dispute and prompt for a description of the nature of that dispute. The graphical user interface is then used to send this information to consulting engagement server 110, which, in embodiments, invokes dispute module 114 to open a record in database 130.

In embodiments, administration module 118 comprises instructions that, when executed by consulting engagement server 110, perform administrative functions in connection with the maintenance of consulting engagement server 110.

In embodiments, administration module 118 is only accessible by end users having administrative authority. Thus, administration module 118 is protected by one or more access control mechanisms. According to embodiments, an administrator that accesses administration module 118 can access database 130 to view user permission levels and user contact information. An administrator can also change permission levels, view account types, view services offered, view services bought or rendered, and view how many users were referred by a specific user. Further, in embodiments, an administrator can "tag" certain user events, such as, for example, which users visited the system but did not create an account, which users created an account but did not use the system, which users used system 100 once but did not return, which users have not been active over a particular time frame, and other events based on marketing data.

Further, in embodiments, an administrator can access administration module 118 to manage services, such as, for example, adding, editing or removing service categories and specialties, and approving service category and specialty addition requests from users. Further, in embodiments, an administrator can delegate administrative access to other users.

In embodiments, system administrators are able to view and resolve submitted disputes. In embodiments, a system administrator is able to access consulting engagement server 110 and the dispute module 114 thereof, either locally or remotely from a separate device, to read the text of the submitted disputes, review recordings of the disputed engagement stored and made available through sessions module 124, send messages to providers or users for verification of the facts of the dispute, and to submit a resolution. In embodiments, an administrator is provided as part of the resolution procedures with the ability to provide a refund to a user directly from the interface that displays the corresponding dispute. Further, the administrator can select a courtesy refund from the company or effect a provider refund.

In embodiments, system administrators can review and approve or disapprove applications submitted by providers through provider qualification and listing module 123 to be approved to provide a service. In embodiments, system administrators can contact providers to request additional supporting information related to a respective provider's application to provide a service.

In embodiments, system administrators can approve or disapprove edits to user and provider profiles and all content thereon submitted by users and providers through the graphical user interface to the account module 111.

In embodiments, sharing and rewards module 122 comprise instructions that, when executed by users and providers through a graphical interface, enable users and providers to share to social networks or via SMS or email the listings of providers, videos or audio recordings of engagements, listing of auctions and the livestreams or recordings thereof, and to receive rewards of credits or other forms of compensation for performing such sharing activities. In embodiments, providers can share links to their own profile via GraphQL tags.

In embodiments, authentication module 116 comprises instructions that, when executed by consulting engagement server 110, authenticates users and providers when accessing system 100. In embodiments, authentication module 116 enables providers and users to sign into their accounts and reset forgotten passwords via e-mail or phone.

Authentication module 116, in embodiments, directs providers and users to a configurable and predefined "intro screen" that displays featured services, featured auctions, featured providers, featured content, and the like. Authentication module 116 also handles users that do not have an account on system 100 by directing those users to screens that allow those users to view providers, listings, and the marketplace without requiring an account. Further, authentication module 116 provides those users with the ability to view banner engagements (i.e., engagements with banner or celebrity providers) and both current and past live streams without requiring an account. In embodiments, authentication module 116 can also allow providers and users to interact with system 100 in their native language.

In embodiments, payment module 117 comprises instructions that, when executed by consulting engagement server 110, process payments from users to providers. In embodiments, payment module 117 enables providers to receive payments. Payment module 117 connects to a provider's bank, Stripe or PayPal account, or equivalent payment account. Payment module 117 also connects to buyers' payment methods such as, for example, credit card accounts, bank accounts, Stripe or PayPal accounts, or equivalent payment accounts. Further, payment module 117, in embodiments, issues receipts to users and provides payment reports to providers for services rendered.

In embodiments, web server 119 is a server application that, when executed by consulting engagement server 110, provides a web interface to consulting engagement server 110 for web-based browser clients. According to embodiments, web server 119 provides marketing content accessible to web clients. Exemplary content includes information about the platform, providers profiles, service categories and specialties thereof, and a link to download an app executed by user devices 101 and provider devices 140. Further, web server 119 provides policy information such as, for example, term and conditions of service, privacy policy, and other legal documentation.

In embodiments, auction module 120 comprises instructions that, when executed by consulting engagement server 110, enable providers to conduct auctions of their services to users. Auctions to provide services are one-on-one or one-to-many engagements to be conducted by and through system 100 at a predefined future time by and between a provider and the user who bids or users who bid the highest for the provider's auctioned engagement. Auction module 120, in embodiments, enables a provider to initiate an auction and specify parameters such as date and time of engagement to be consummated upon completion of the auction, minimum bid, description of specialty to be offered and amount of time to be auctioned. Auction module 120, in embodiments, enables a user to bid on auctions. Engagements won by bidding on an auction are consummated using communication module 113. Auction module 120 has functionality that enables system 100 to live stream to a broad audience the engagement resulting from an auction.

Figure 2:
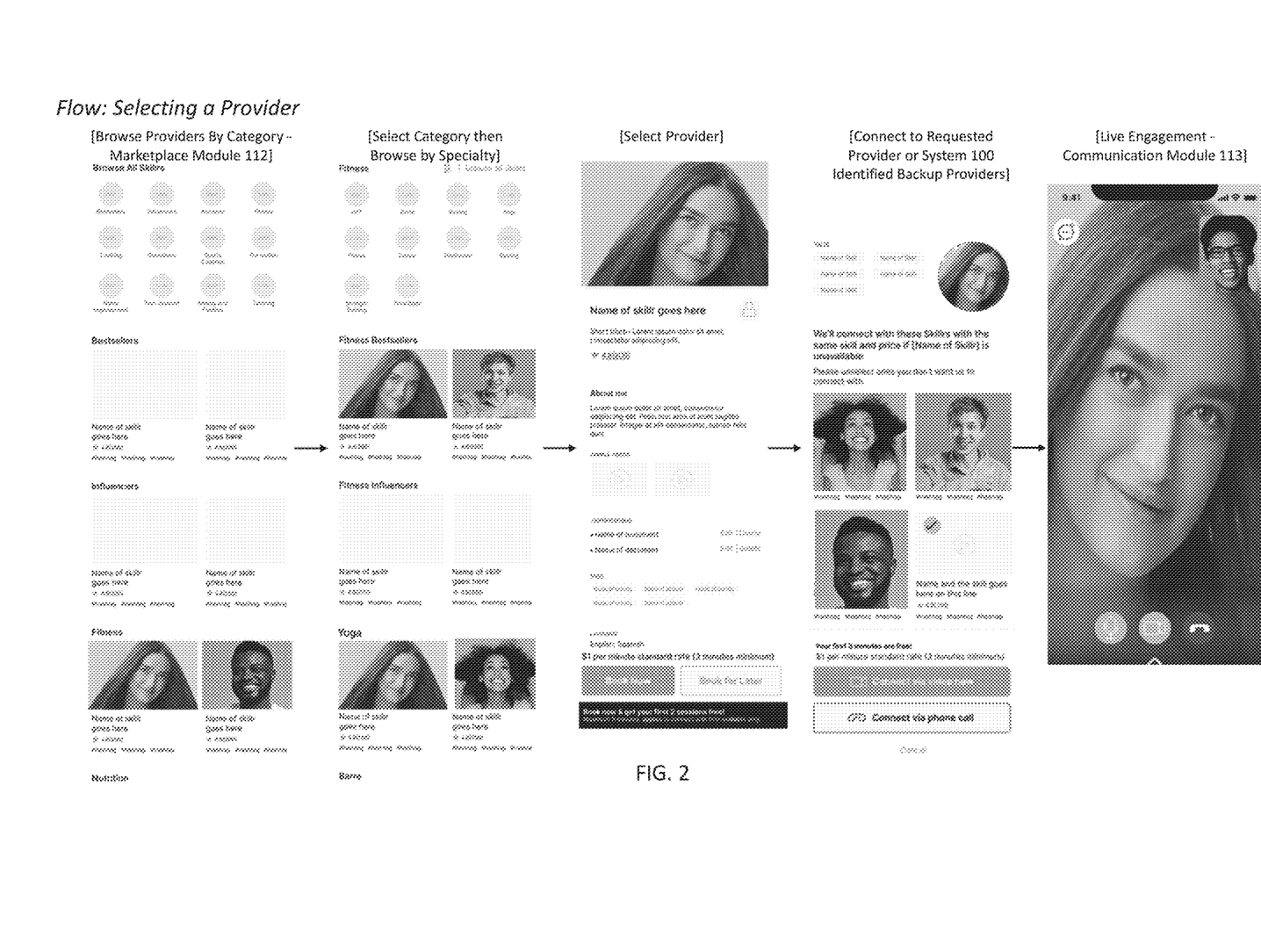
Figure 3:
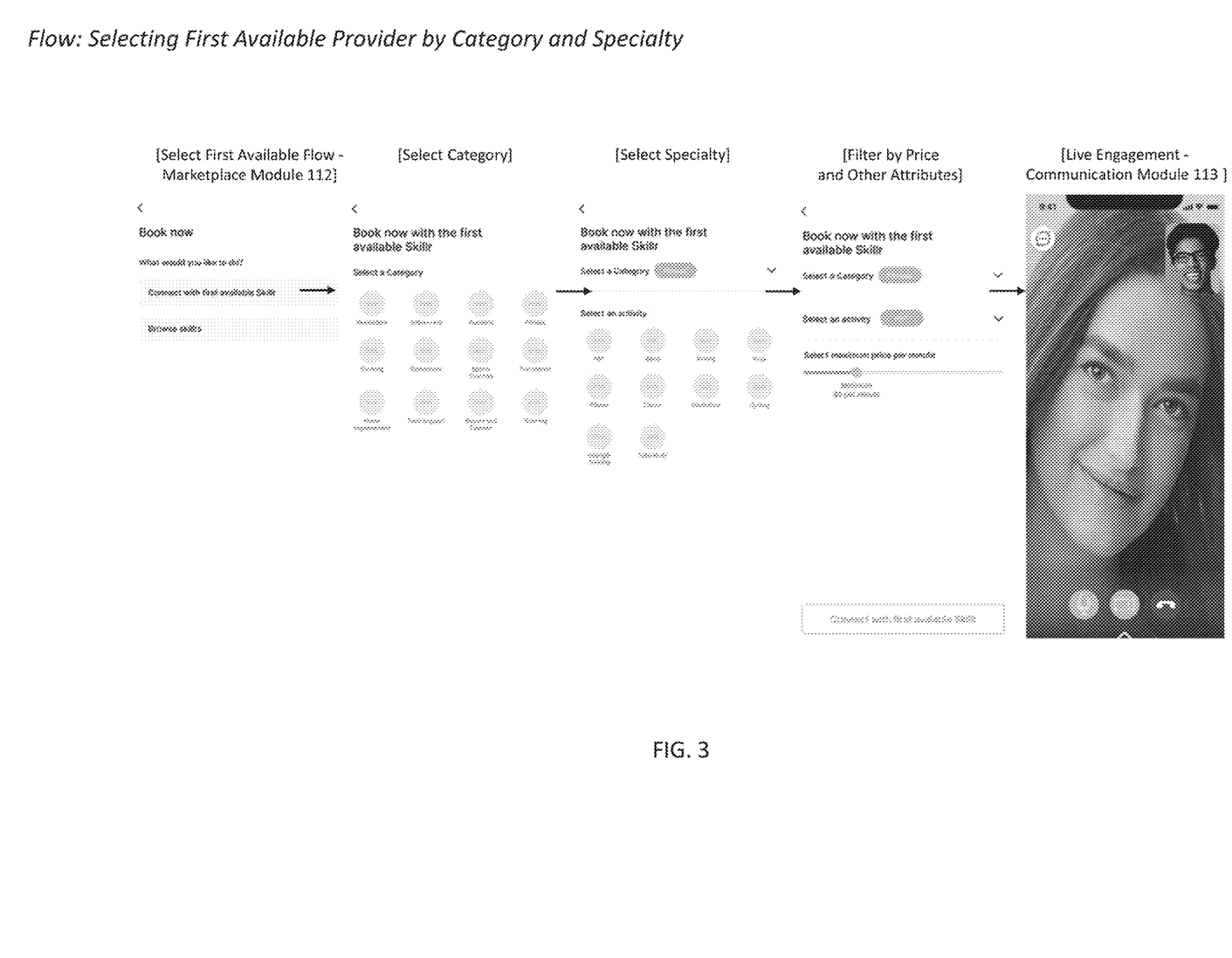

FIGS. 2-4 depict exemplary graphical user interfaces that are rendered on user devices 101 and/or provider devices 140, in accordance with embodiments of the present invention. Each of FIGS. 2-4 depicts an exemplary flow of a user interaction with the present invention.

FIG. 2 depicts the flow that a user performs for selecting a provider, according to embodiments. As shown in the figure, a user can browse providers by category. A user can then select a category and browse providers by specialty. A user can then select a provider. When a provider is selected, the user can be connected to the selected provider or to one of several backup providers identified by system 100 as being available should the selected provider not be available. Once connected, a live engagement is established between the user and the provider via communication module 113.

FIG. 3 depicts a flow that user performs for engaging the first provider available and approved to provide a specialty sought without preference for provider, according to embodiments. As shown in the figure, a user can choose to connect with a first available provider by making a selection on the graphical user interface. Once a selection is made, the user selects a service category and the specialty thereof sought. The user can then further filter by such criteria as, for example, maximum price per minute. The user is then connected with the first available provider and a live engagement between user and provider is established via communication module 113.

FIG. 4 depicts flows that a user performs for bidding on an auction to consummate an engagement with a provider, and for reviewing past and upcoming engagements.

Figure 5:
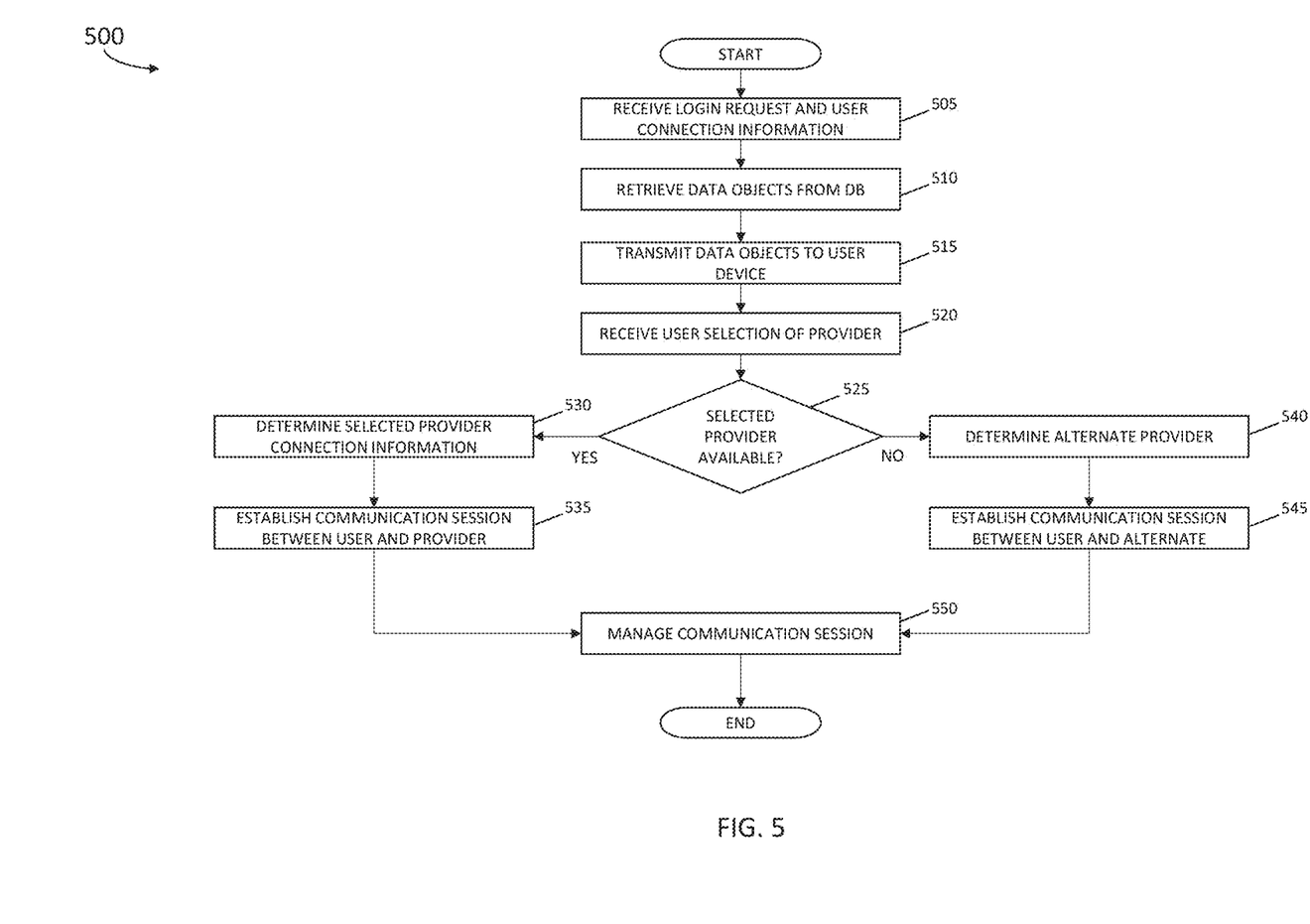
FIG. 5 is a flow diagram that illustrates the provision of real-time expert services in accordance with exemplary embodiments of the present invention.

FIG. 5 is a flow diagram that depicts a method 500 of providing expert services, in accordance with exemplary embodiments of the present invention. In embodiments, method 500 can be carried out by a computer system or server, such as consulting engagement server 110, depicted in FIG. 1. For the purpose of explanation and not limitation, method 500 is described as being carried out by consulting engagement server 110.

Method 500 begins at step 505. At step 505, consulting engagement server 110 receives a login request and connection information from a user device, such as any of user devices 101-1 to 101-N depicted in FIG. 1. User devices can be, for example, mobile computing devices, such as smartphones.

Once consulting engagement server 110 authenticates and authorizes the login request, consulting engagement server 110, at step 510, retrieves a plurality of data objects from a database that is operatively connected to the server, such as database 130 in FIG. 1. The retrieved data objects each includes data that corresponds to a provider of expert services. Such data can be, for example, pricing data, availability data, specialties offered, certification data, other evidentiary data, and reviews data.

Next, at step 515, consulting engagement server 110 transmits the plurality of data objects to the user device, which the user device uses to render a graphical user interface that displays to an end user information about expert service providers which the user may select. An exemplary graphical user interface is shown in FIG. 2.

At step 520, consulting engagement server 110 receives, from the user device, an indication of a selection of a provider which the user has made. Such a selection can be effected by, for example, an end user touching a graphical user interface element on the touchscreen of a mobile device.

At step 525, consulting engagement server 110 determines whether the selected expert services provider is available to provide services by reviewing the availability schedule the service provider had provided as well as by communicating directly with the service provider.

If the selected expert service provider is available, then method 500 proceeds to step 530. At step 530, consulting engagement server 110 determines connection information for the selected provider. Connection information can be, for example, a telephone number, a network address, or any information that can uniquely identify a network device associated with the provider. Such a provider device can be any one of provider devices 140-1 to 140-N, depicted in FIG. 1. Provider devices may be mobile computing devices, such as smartphones.

Using this connection information, consulting engagement server 110 establishes a communication session between the user device and the provider device. In embodiments, consulting engagement server 110 determines provider connection information for the provider device. Provider connection information can include a telephone number, network address, or any data that uniquely identifies the provider device on a network. Consulting engagement server 110 transmits a connection request to the provider device using the provider connection information. Consulting engagement server then receives a confirmation indication from the provider device.

If, however, the selected provider is determined to not be available at step 525, method 500 proceeds to step 540. At step 540 consulting engagement serve 110 determines an alternate available provider. According to embodiments, an alternate available provider can be determined based on specialties offered, similar certifications, similar pricing, and other criteria associated with the alternate provider.

After an alternate provider is determined, then, at step 545, consulting engagement server 110 establishes a communication session between the user device and a provider device associated with the alternate provider. The communication session is established in accordance with techniques described in connection with step 535.

Next, once a communication session has been established with either the selected or alternate provider device, method 500 proceeds to step 550. At step 550, consulting engagement server 110 manages the established communication session between the user device and provider device. In embodiments, consulting engagement server 110 receives text, image, and real-time video data from the user device and transmits this data to the provider device using the provider connection information. Similarly, consulting engagement server 110 receives text, image, and real-time video data from the provider device and transmits this data to the user device using the user connection information. In this way, consulting engagement server 110 is able to support the provision of real-time expert services over a computer network.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A method of providing real-time expert services over a computer network, the method comprising:
   (A) receiving, at a computer system comprising one or more computers, from a user device, a login request and user connection information for the user device;
   (B) responsive to the login request, retrieving, by the computer system from a database operatively connected to the computer system, a plurality of data objects, wherein each data object includes data that corresponds to one of a plurality of expert service providers;
   (C) transmitting, by the computer system to the user device using the user connection information, the plurality of data objects, wherein the user device is configured to render a graphical user interface that displays information corresponding to the plurality of data objects;
   (D) receiving, by the computer system from the user device, a selection indication corresponding to a first expert service provider from the plurality of expert providers and an alternate expert service provider if the first expert service provider is unavailable;
   (E) determining, by the computer system in response to the selection indication, that the first expert service provided is unavailable and further determining first provider connection information for a first provider device corresponding to the alternate expert service provider;
   (F) transmitting, by the computer system to the first provider device using the first provider connection information, a first connection request;
   (G) receiving, by the computer system from the first provider device, a first confirmation indication;
   (H) establishing, by the computer system, a first communication session between the user device and first provider device; and
   (I) managing, by the computer system, the first communication session, wherein the managing comprises:
      a. receiving first data from the user device;
      b. transmitting the first data to the first provider device using the first provider connection information;
      c. receiving second data from the first provider device; and
      d. transmitting the second data to the user device using the user connection information.

2. The method of claim 1, wherein the user device is a mobile computing device.

3. The method of claim 1, wherein the provider device is a mobile computing device.

4. The method of claim 1, wherein the first and second data comprise text and image data.

5. The method of claim 1, wherein the first and second data comprise real-time video data.

6. The method of claim 1, wherein each of the plurality of data objects corresponding to one of the plurality of expert service providers includes an availability indicator for the corresponding provider, a specialty for the corresponding provider, and a price for the corresponding provider.

7. The method of claim 1, further comprising:
   (J) receiving, by the computer system from the user device, rather than a selection indication corresponding to the first and alternate expert service providers, a specialty selection indication corresponding to a specialty that is immediately sought, wherein the specialty selection indication does not specify a provider;
   (K) determining, by the computer system, a second expert service provider that provides the immediately sought specialty and that is currently available;
   (L) determining, by the computer system, second provider connection information for a second provider device corresponding to the second expert service provider; and
   (M) establishing, by the computer system, a second communication session between the user device and the second provider device.

8. The method of claim 1, further comprising:
   (J) receiving, by the computer system from the user device, a bid amount corresponding to expert services provided by a second expert service provider, wherein the expert services provided by the second expert service provider are offered by means of an auction;
   (K) determining, by the computer system, that the bid amount received from the user device upon the completion of the auction is greater than a plurality of previously received bid amounts;
   (L) determining, by the computer system in response to the determination in step (K), second provider connection information for a second provider device corresponding to the second expert service provider;
   (M) transmitting, by the computer system to the second provider device using the second provider connection information, a second connection request;
   (N) receiving, by the computer system from the second provider device, a second confirmation indication; and
   (O) establishing, by the computer system, a second communication session between the user device and the second provider device.

9. A system comprising:
   a processor; and
   a memory, wherein the processor is programmed to perform a method of providing real-time expert services over a computer network, the method comprising:
      (A) receiving, at a computer system comprising one or more computers, from a user device, a login request and user connection information for the user device;
      (B) responsive to the login request, retrieving, by the computer system from a database operatively connected to the computer system, a plurality of data objects, wherein each data object includes data that corresponds to one of a plurality of expert service providers;
      (C) transmitting, by the computer system to the user device using the user connection information, the plurality of data objects, wherein the user device is configured to render a graphical user interface that displays information corresponding to the plurality of data objects;

(D) receiving, by the computer system from the user device, a selection indication corresponding to a first expert service provider from the plurality of expert providers and an alternate expert service provider if the first expert service provider is unavailable (E) determining, by the computer system in response to the selection indication, that the first expert service provided is unavailable and further determining first provider connection information for a first provider device corresponding to the alternate expert service provider;

(F) transmitting, by the computer system to the provider device using the first provider connection information, a first connection request;

(G) receiving, by the computer system from first the provider device, a first confirmation indication;

(H) establishing, by the computer system, a first communication session between the user device and first provider device; and (I) managing, by the computer system, the first communication session, wherein the managing comprises:
   a. receiving first data from the user device;
   b. transmitting the first data to the provider device using the first provider connection information;
   c. receiving second data from the first provider device; and
   d. transmitting the second data to the user device using the user connection information.

10. The system of claim 9, wherein the user device is a mobile computing device.

11. The system of claim 9, wherein the provider device is a mobile computing device.

12. The system of claim 9, wherein the first and second data comprise text and image data.

13. The system of claim 9, wherein the first and second data comprise real-time video data.

14. The system of claim 9, wherein each of the plurality of data objects corresponding to one of the plurality of expert service providers includes and availability indicator for the corresponding provider, a specialty for the corresponding provider, and a price for the corresponding provider.

15. The system of claim 9, wherein the method further comprises:
(J) receiving, by the computer system from the user device, rather than a selection indication corresponding to the first and alternate expert service providers, a specialty selection indication corresponding to a specialty that is immediately sought, wherein the specialty selection indication does not specify a provider;
(K) determining, by the computer system, a second expert service provider that provides the immediately sought specialty and that is currently available;
(L) determining, by the computer system, second provider connection information for a second provider device corresponding to the second expert service provider; and
(M) establishing, by the computer system, a second communication session between the user device and the second provider device.

16. The system of claim 9, wherein the method further comprises:

(J) receiving, by the computer system from the user device, a bid amount corresponding to expert services provided by a second expert service provider, wherein the expert service provided by the second expert service provider are offered by means of an auction;
(K) determining, by the computer system, that the bid amount received from the user device upon the completion of the auction is greater than a plurality of previously received bid amounts;
(L) determining, by the computer system in response to the determination in step (K), second provider connection information for a second provider device corresponding to the second expert service provider;
(M) transmitting, by the computer system to the second provider device using the first provider connection information, a second connection request;
(N) receiving, by the computer system from the second provider device, a second confirmation indication; and
(O) establishing, by the computer system, a second communication session between the user device and the second provider device.

17. A non-transitory computer-readable medium that stores a plurality of instructions, wherein the instructions, when executed by a processor that operatively connected to a computer system, cause the processor to perform a method of providing real-time expert services over a computer network, the method comprising:

(A) receiving, at a computer system comprising one or more computers, from a user device, a login request and user connection information for the user device;

(B) responsive to the login request, retrieving, by the computer system from a database operatively connected to the computer system, a plurality of data objects, wherein each data object includes data that corresponds to one of a plurality of expert service providers;

(C) transmitting, by the computer system to the user device using the user connection information, the plurality of data objects, wherein the user device is configured to render a graphical user interface that displays information corresponding to the plurality of data objects;

(D) receiving, by the computer system from the user device, a selection indication corresponding to a first expert service provider from the plurality of expert providers and an alternate expert service provider if the first expert service provider is unavailable;

(E) determining, by the computer system in response to the selection indication, that the first expert service provided is unavailable and further determining first provider connection information for a first provider device corresponding to the alternate expert service provider;

(F) transmitting, by the computer system to the provider device using the first provider connection information, a first connection request;

(G) receiving, by the computer system from the first provider device, a first confirmation indication;

(H) establishing, by the computer system, a first communication session between the user device and first provider device; and (I) managing, by the computer system, the first communication session, wherein the managing comprises:
   a. receiving first data from the user device;
   b. transmitting the first data to the first provider device using the first provider connection information;

c. receiving second data from the first provider device; and d. transmitting the second data to the user device using the user connection information.

18. The computer-readable medium of claim 17, wherein each of the plurality of data objects corresponding to one of the plurality of expert service providers includes and availability indicator for the corresponding provider, a specialty for the corresponding provider, and a price for the corresponding provider.

19. The computer-readable medium of claim 17, wherein the method further comprises:

(J) receiving, by the computer system from the user device, rather than a selection indication corresponding to the first and alternate expert service providers, a specialty selection indication corresponding to a specialty that is immediately sought, wherein the specialty selection indication does not specify a provider;

(K) determining, by the computer system, a second expert service provider that provides the immediately sought specialty and that is currently available;

(L) determining, by the computer system, second provider connection information for a second provider device corresponding to the second expert service provider; and (M) establishing, by the computer system, a second communication session between the user device and the second provider device.

20. The computer-readable medium of claim 17, wherein the method further comprises:

(J) receiving, by the computer system from the user device, a bid amount corresponding to expert services provided by a second expert service provider, wherein the expert services provided by the second expert service provider are offered by means of an auction;

(K) determining, by the computer system, that the bid amount received from the user device upon the completion of the auction is greater than a plurality of previously received bid amounts;

(L) determining, by the computer system in response to the determination in step (K), second provider connection information for a second provider device corresponding to the second expert service provider;

(M) transmitting, by the computer system to the second provider device using the second provider connection information, a second connection request;

(N) receiving, by the computer system from the second provider device, a second confirmation indication; and (O) establishing, by the computer system, a second communication session between the user device and the second provider device.

* * * * *